UNITED STATES PATENT OFFICE.

JOHN W. HYATT, OF NEWARK, NEW JERSEY.

IMPROVEMENT IN VARNISHES.

Specification forming part of Letters Patent No. 209,570, dated November 5, 1878; application filed January 21, 1878.

*To all whom it may concern:*

Be it known that I, JOHN W. HYATT, of Newark, in the county of Essex and State of New Jersey, have invented a new and useful Improvement in Varnishes, of which the following is a specification, reference being had to the accompanying drawings.

Heretofore, so far as known, all dye-stuffs for the purpose of producing an appearance resembling ebony have been used only in or in connection with some aqueous solution; but mixtures containing water are very objectionable, as they cause the expansion or swelling of any wood or fiber to which they may be applied, and this necessitates the subsequent smoothing of the surface; hence such matters are unsuitable as a base for a coloring-varnish.

It has been discovered that alcohol or methylic spirit, or both combined, will effect the solution of the solid extract of logwood, and that such solution can be employed in conjunction with the tincture of muriate of iron and a gum or resin soluble in alcohol or methylic spirit, or spirits of camphor, to produce a most satisfactory varnish for causing an ebony appearance, and which can be applied to a fibrous surface without causing the swelling or distension thereof.

The preferred formula is one that contains approximately the following proportions, though no limitation as to proportions is admitted: Shellac, four (4) parts; alcohol, thirty-seven (37) parts; extract of logwood, (solid,) seven (7) parts; tincture of muriate of iron, eight (8) parts.

Any gum-resin of the order above mentioned or a solution of pyroxyline may be used in place of the shellac, or these several substances may be used together. Methylic spirit may be employed in lieu of the alcohol, or the two may be used combined.

The composition may be first applied to a surface, the tincture of muriate of iron being omitted at first, and then applied after the application of the other combined ingredients; or this process may be reversed. In either operation a fine ebony hue will be developed.

In the manner last above specified fibrous surfaces may readily be mottled or grained, checkered, or otherwise ornamented by applying the tincture of muriate of iron to only those particular portions of the surface where the dark hue is desired.

What I claim as my invention, and desire to secure by Letters Patent, is—

1. The combination, with the solid extract of logwood dissolved in either alcoholic or methylic spirit, or both, of a resin soluble in alcoholic or methylic spirit, or of pyroxyline, or the equivalent of such resin or pyroxyline, and the tincture of muriate of iron, to produce a varnish for effecting an ebony appearance, substantially as specified.

2. The process herein described for producing an ebony appearance, which consists in treating a surface with the solid extract of logwood, dissolved as aforesaid and combined with a gum or resin or pyroxyline, and applying to the surface thus treated, or to portions thereof, the tincture of muriate of iron, or the reverse of such process, substantially as set forth.

In testimony that I claim the foregoing improvement in varnish, as above described, I have hereunto set my hand this 19th day of January, 1878.

JOHN W. HYATT.

Witnesses:
E. P. CLARK, Jr.,
J. E. HOWELL.